United States Patent [19]
Nickey et al.

[11] Patent Number: 5,893,942
[45] Date of Patent: Apr. 13, 1999

[54] QUICK CHANGE INVERT ARM ASSEMBLY

[75] Inventors: George A. Nickey, Maumee; Robin L. Flynn, Waterville, both of Ohio; Dudley T. Olson, Noblesville, Ind.

[73] Assignee: Owens-Brockway Glass Container Inc., Toledo, Ohio

[21] Appl. No.: 08/960,455

[22] Filed: Oct. 29, 1997

[51] Int. Cl.$^6$ .............................. C03B 9/325; C03B 9/353
[52] U.S. Cl. .................. 65/171; 65/172; 65/235; 65/260; 65/323; 65/359
[58] Field of Search .............................. 65/27, 159, 171, 65/172, 235, 260, 323, 359, 361

[56] References Cited

U.S. PATENT DOCUMENTS

| | | | |
|---|---|---|---|
| 2,949,701 | 8/1960 | Olson et al. | 65/235 |
| 3,024,571 | 3/1962 | Abbott et al. | 65/311 |
| 3,233,999 | 2/1966 | Mumford | 65/359 |
| 3,244,499 | 4/1966 | Wiley | 65/359 |
| 3,249,418 | 5/1966 | Irwin et al. | 65/356 |
| 3,445,218 | 5/1969 | Trudeau | 65/235 |
| 3,617,233 | 11/1971 | Mumford | 65/307 |
| 3,934,998 | 1/1976 | Rowe | 65/172 |
| 4,222,762 | 9/1980 | Braithwaite | 65/266 |

*Primary Examiner*—Stanley S. Silverman
*Assistant Examiner*—Sean Vincent

[57] ABSTRACT

An invert arm assembly for a glass container forming machine of the I.S. type, the invert arm assembly having an opposed pair of invert arm segments that are movable toward and away from one another and define one or more neck ring assembly receiving apertures when the invert arm segments are disposed adjacent to one another. A neck ring assembly is placed in each aperture and is locked in place with respect to the invert arm segments. Each neck ring assembly can be removed from the aperture in which it is located by inserting a portion of a hand tool in a portion of the invert arm segments to unlock the neck ring assembly from the aperture without moving the invert arm segments with respect to one another.

6 Claims, 12 Drawing Sheets

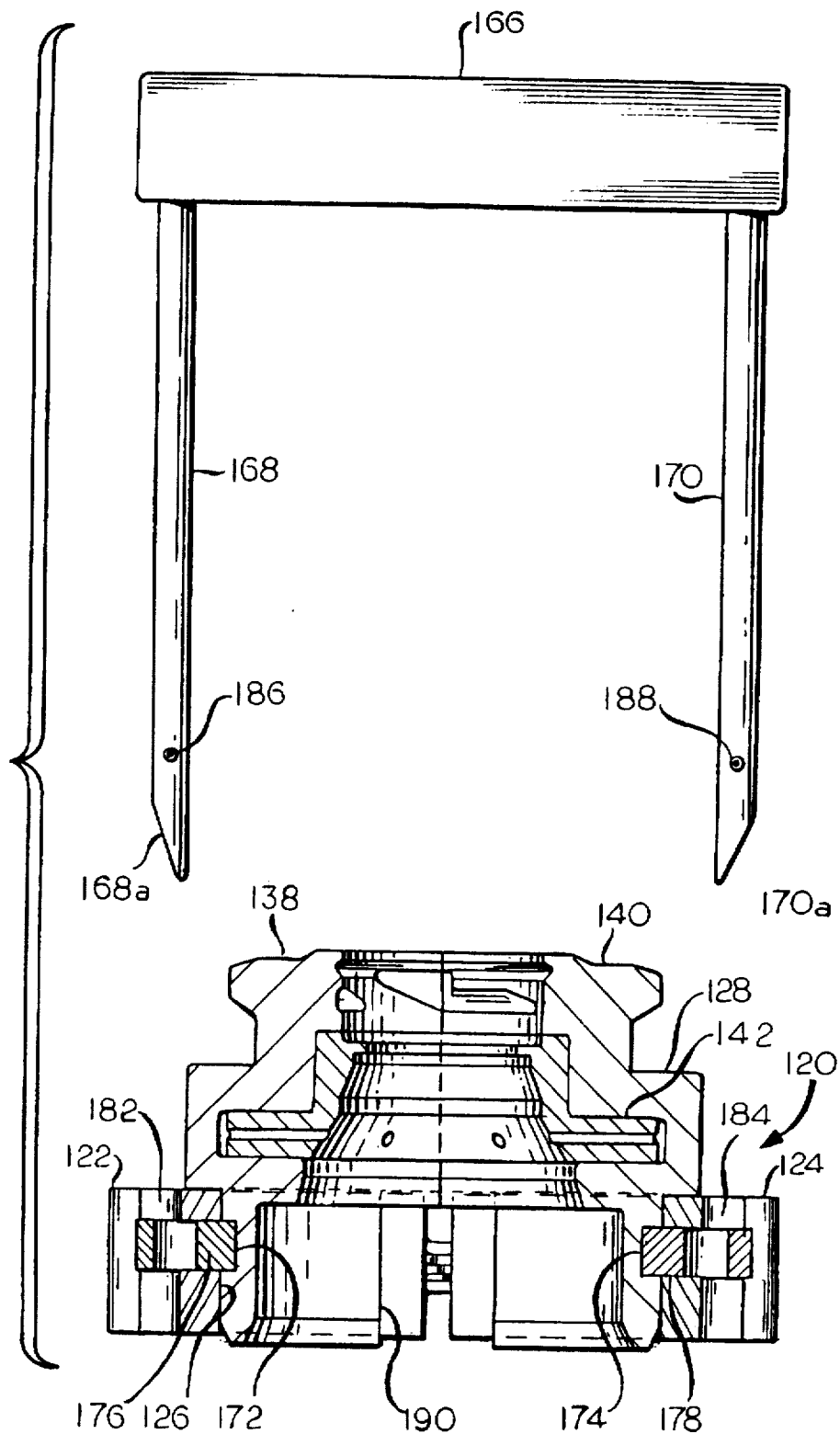

5,893,942

1

QUICK CHANGE INVERT ARM ASSEMBLY

FIELD OF THE INVENTION

This invention relates to an invert arm assembly for a glass container forming machine of the individual section (I.S.) type. More particularly, this invention relates to an invert arm assembly of the foregoing type that carries one or more neck ring assemblies, usually two, three or four such neck ring assemblies, in an opposed pair of separable arms, which do not need to be separated to permit rapid replacement of the neck ring assemblies.

BACKGROUND OF THE INVENTION

Many, if not most, glass containers, including a wide variety of bottles and jars, are, and for many years have been, manufactured by machines of the I.S. type, a type that uses a multiplicity of side-by-side sections each of which forms containers in a two-step molding operation. In a glass container forming operation of this type, a preform of the container, often called a parison or a blank, is formed in a first mold at a blank molding station of the I.S. machine section, either by pressing or blowing, and the blank is then transferred by a 180° inverting operation in a vertical plane to a second mold of the I.S. machine section, often called a blow mold, for forming into the finished container by blowing. Typically, each container is provided with a threaded or otherwise contoured closure-receiving portion at its open end, which is usually referred to as a "finish," and the finish is formed by an assembly of separable segments that are joined end to end in an annular pattern during the formation of the finish, an assembly that is usually referred to as a "neck ring assembly" or a "neck mold assembly."

Each neck ring assembly is carried by an assembly that is used to transfer the parison from the parison mold to the blow mold, and the parison is carried by the neck ring assembly during the transfer to the blow mold. The assembly used to transfer the parison from the blank mold to the blow mold is usually referred to as an "invert arm assembly." Typically, each invert arm assembly carries two, three or four neck ring assemblies, each with a parison, depending on whether the associated I.S. machine is designed for double gob, triple gob or quadruple gob operation, and each invert arm assembly is made up of an opposed pair of arm segments that separate from one another when it is desired to remove the blown containers from their neck ring assemblies for further processing. After removal of the blown containers from the neck ring assemblies carried by the invert arm assembly, the invert arm assembly, with its neck ring assemblies, is then transferred back to the blank mold side, by another 180° turning operation, for a repeat of the process.

From time to time in the operation of an I.S. machine it is necessary to replace the neck ring assemblies carried by an invert arm assembly, for example, as part of a job change to a container with a different size or type of finish or because of normal wear. Heretofore such neck ring assembly changes would be time consuming, requiring separation of the invert arm assembly segments, and followed by removal and replacement of neck ring assemblies, which were usually individually latched to opposed invert arm segments, an operation performed in a location not readily accessible and involving the prolonged usage of hand tools with an attendant risk that such tools could be dropped into the forming machine.

U.S. Pat. Nos. 3,233,999 (Mumford) and 3,617,233 (Mumford), the disclosure of each which is incorporated by reference herein, disclose prior art versions of invert arm assemblies for I.S. machines.

BRIEF DESCRIPTION OF THE INVENTION

In accordance with the present invention, the aforesaid and other problems associated with prior art I.S. invert arm assemblies are avoided by providing an invert arm assembly that is capable of having neck ring assemblies quickly installed therein, and removed therefrom, without the need to separate the arm segments during the removal and installation of the neck ring assemblies. This permits the replacement of neck ring assemblies while the invert arm assembly is at the blank mold side of an I.S. machine, which is a much more accessible location than the blow mold side of the machine, the location where prior art invert arm assemblies must be located during removal and replacement of neck ring assemblies.

The invert arm assembly of the present invention includes neck ring assemblies that can be installed therein, and removed therefrom, by a simple push and twist motion or with the aid of a simple hand tool, and individual neck ring assemblies carried by the same invert arm assembly, which are individually locked in place, can be individually replaced whereas prior art neck ring assemblies were subject to disengagement during replacement of all such assemblies because of a common locking arrangement. The invert arm segments of the invert arm assembly are also provided with alignment pins, which help to ensure proper alignment upon the closing of the arm segments after removal of blown containers therefrom and limit individual arm segment movement relative to each other while in their open positions, and the invert arm segments are also provided with fixed stops at the arm segments mounting locations to simplify arm segment position adjustment when replacing an arm segment.

Accordingly, it is an object of the present invention to provide an improved invert arm assembly for, a glass container forming machine of the individual section type. More particularly, it is an object of the present invention to provide an invert arm assembly of the foregoing character that carries one or more neck ring assemblies which may be readily installed therein, or removed therefrom, without the need to separate the invert arm segments that are a part of such invert arm assembly.

For a further understanding of the present invention and the objects thereof, attention is directed to the drawing and the following brief description thereof, to the detailed description of the preferred embodiment of the invention and to the appended claims.

BRIEF DESCRIPTION OF THE DRAWING

FIG. 14 is an elevation view, in cross section, of a neck ring assembly for the invert arm assembly of FIGS. 10–13 in relationship to a hand tool used to permit the neck ring assembly to be installed in, or removed from, the invert arm assembly;

DETAILED DESCRIPTION OF THE PREFERRED EMBODIMENT

Figure 1:
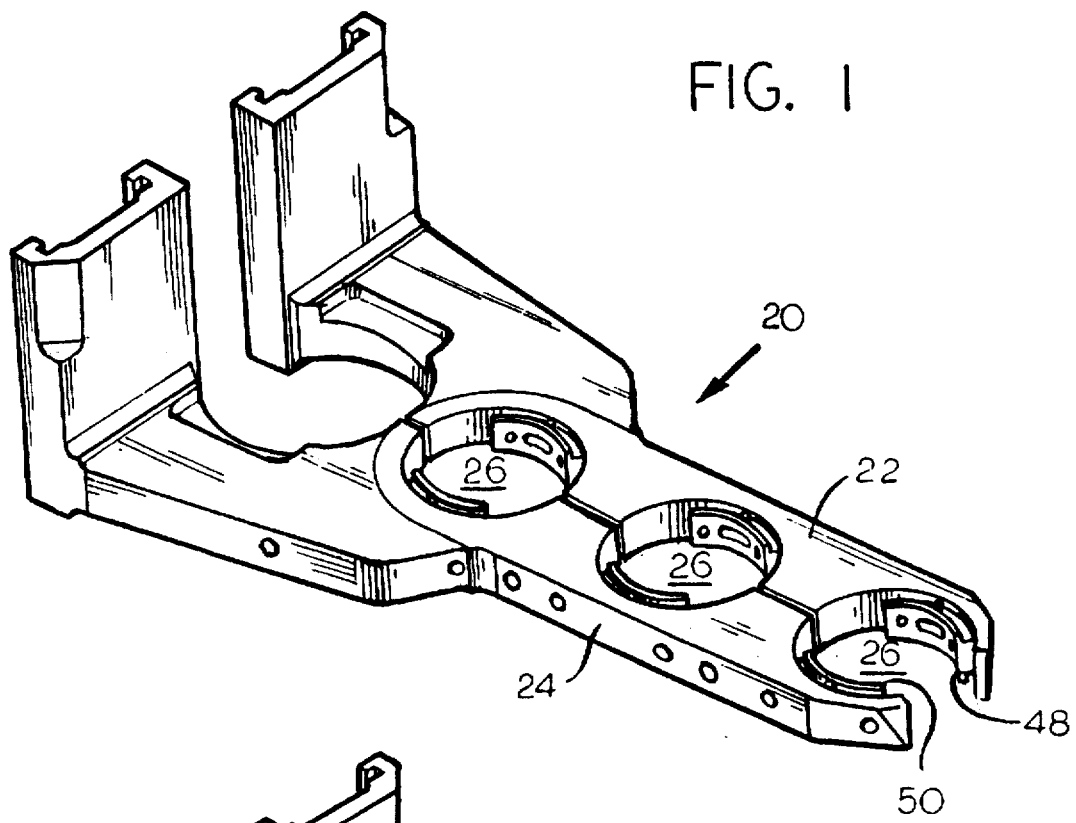
FIG. 1 is a perspective view of an invert arm assembly, without neck ring assemblies, according to an embodiment of the present invention.
Figure 4:
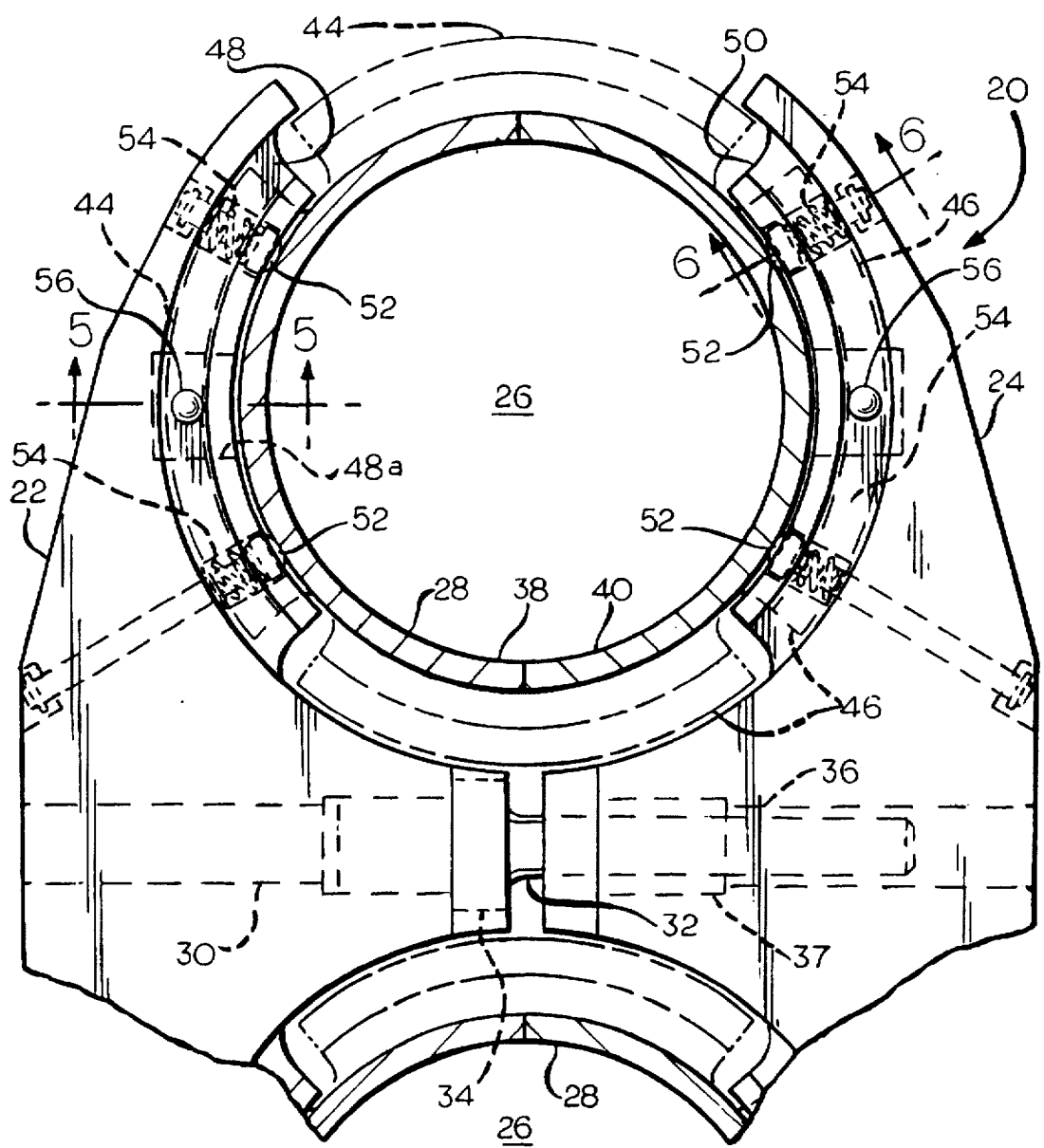
FIG. 4 is a fragmentary plan view, at an enlarged scale, of the invert arm assembly of FIGS. 1–3 with a neck ring assembly installed therein.

FIG. 1 illustrates an invert arm assembly according to the present invention, which is generally identified by reference numeral 20. The invert arm assembly 20 is made up of side-by-side invert arm segments 22, 24. The invert arm segments 22, 24 are separable to open a space therebetween, as is known in the art, but when closed, as shown, define apertures 26 for receiving neck ring assemblies that must be removable from the invert arm assembly 20. The invert arm assembly 20 is shown in FIG. 4 with a neck ring assembly 28 installed in the radially outermost of the apertures 26, and it is to be understood that similar neck ring assemblies 28 will be installed in the other apertures 26 of the invert arm assembly 20 during the operation of an I.S. glass container forming machines having invert arm assemblies corresponding to the invert arm assembly 20, one such invert arm assembly 20 for each section of the I.S. machine. Typically, such an I.S. machine will have at least six such sections, and in some instances eight or ten or even twelve such sections. In any case, the invert arm assembly 20 is shown as having three apertures 26, and it is, therefore, designed for use with a triple gob I.S. machine, that is, a machine that is capable of forming three glass containers at a time at each machine section, as is also understood in the art. Of course, it is also contemplated that the design of the invert arm assembly 20 can be adapted for use in double gob I.S. machines, that is, machines capable of forming two glass containers at a time at each machine section, or in quad I.S. machines, that is, machines capable of forming four glass containers at a time at each machine section.

Figure 7:
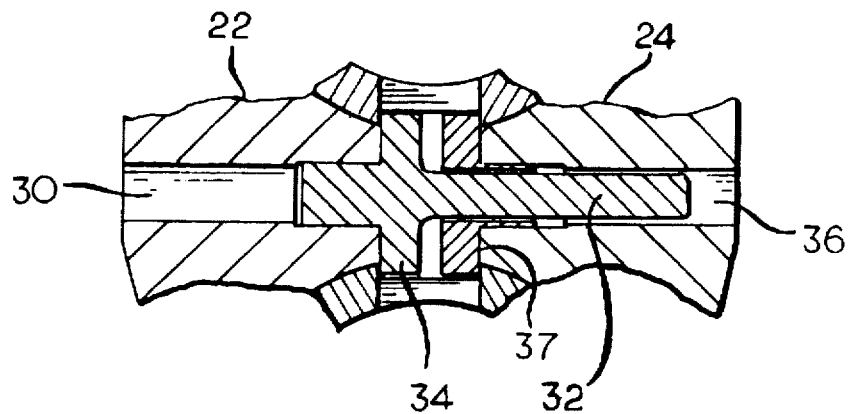
FIG. 7 is a cross-sectional view taken on line 7—7 of FIG. 3.

To accurately align the invert arm segments 22, 24 with respect to one another upon their closing and to limit movement relative to one another upon revert (returning after removal of parisons therefrom) while in the open positions, one of the invert arm segments 22, 24, shown as the invert arm segment 22, is provided with an opening 30, and a pin 32 is inserted in the opening 30, the pin 32 being provided with a collar 34 (FIG. 7) to limit the depth of the insertion of the pin 32 into the opening 30. The other of the invert arm segments 22, 24, shown as the invert arm segment 34, is provided with an opening 36 that is aligned with the opening 30 when the invert arm segments 22, 24 are properly aligned. The free end of the pin 32 is slidably received within the opening 36 as the invert arm segments 22, 24 open and close with respect to one another to ensure the invert arm segments remain in proper alignment with one another. The opening 36 is lined with a generally T-shaped annular bushing 37 to facilitate the sliding of the free end of the pin 32 with respect to the opening 36.

Figure 8:
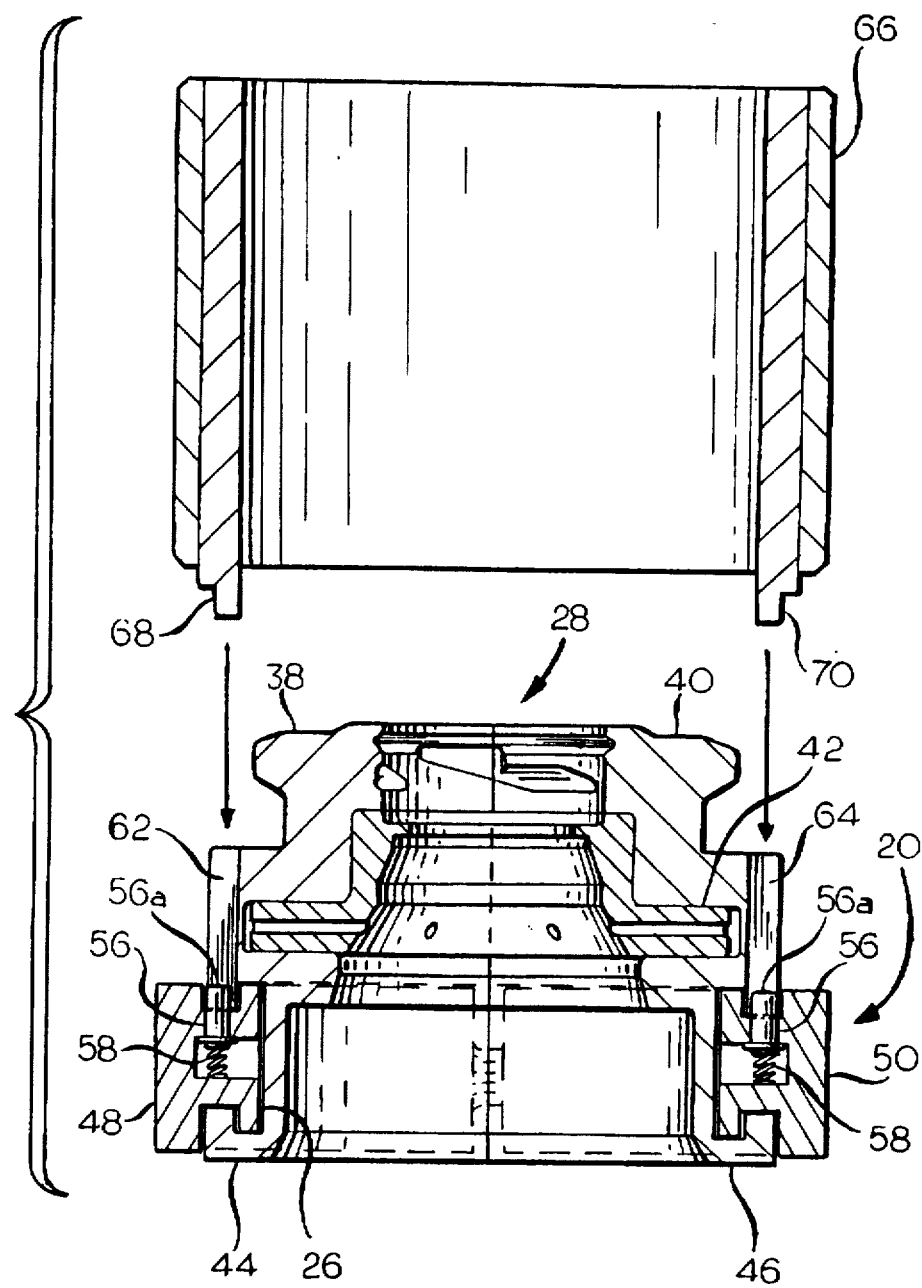
FIG. 8 is an elevation view in cross-section of a neck ring assembly for the invert arm assembly of FIGS. 1–7 in relationship to a hand tool used to permit the neck ring assembly to be removed from the invert arm assembly.

The neck ring assembly 28 is made up of a pair of semi-circular neck ring segments 38, 40, which are joined end to end in a circular configuration, as is shown in FIG. 4, when the invert arm segments 22, 24 are closed with respect to one another. In this position of the neck ring segments 38, 40, the neck ring assembly 28 is capable of molding a finish on a glass container being formed and of grasping the container being formed during its transfer by a 180° inverting motion in a vertical plane from the blank mold station to the blow mold station of an I.S. glass forming machine. The neck ring assembly 20 is also provided with an internal annular member 42 (FIG. 8) that is endless in configuration, usually called a guide ring, and the guidering 42 serves to guide the neck ring segments 38, 40 as they open and close with respect to one another. An assembly of a pair of neck ring segments and a guide ring is disclosed in U.S. Pat. No. 5,609,664 (Olson), the disclosure of which is also incorporated herein by reference.

The neck ring segments 38, 40 are provided with diametrically opposed, radially outwardly projecting flanges 44, 46, which are circumferentially spaced apart from one another, and the invert arm segments 22, 24, are provided with a diametrically opposed pair of circumferentially spaced apart radially inwardly projecting flanges 48, 50, respectively, surrounding each of the apertures 26. The spacing between the ends of the flanges 48, 50 is sufficient to permit a neck ring assembly 28 to be inserted into an aperture 26 when the flanges 44, 46 of the neck ring assembly 28 are properly aligned, that is, at right angles to their normal positions during the operation of the invert arm assembly 20 in an I.S. machine. The normal operating positions of the neck ring segments 38, 40 are shown in FIG. 4 at the 3 o'clock and 9 o'clock positions, respectively, and the positions of the flanges 44, 46 of the neck ring segments 38, 40 during insertion of a neck ring assembly 28 into the aperture 26, or during removal of the neck ring assembly 28 from the aperture 26, are shown in phantom in FIG. 4, at the 12 o'clock and 6 o'clock positions.

Figure 6:
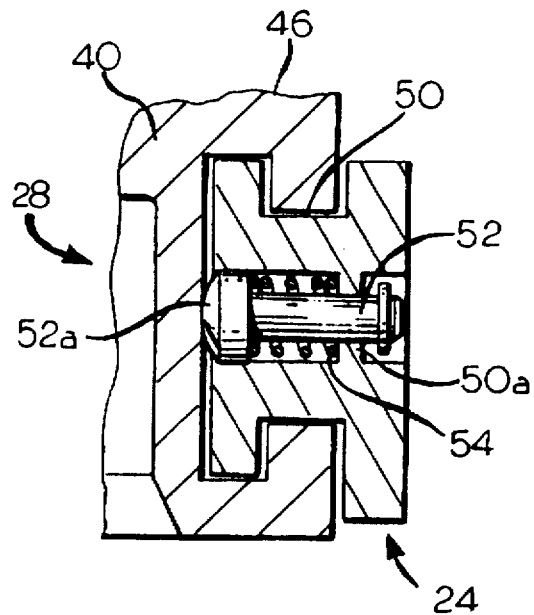
FIG. 6 is a cross-sectional view taken on line 6—6 of FIG. 4.

Each of the invert arm segment flanges 48, 50 is generally T-shaped, with a radially innermost head portion, as is shown in FIG. 6 for the invert arm segment flange 50 of the invert arm segment 24, and each neck ring segment flange 44, 46 is generally C-shaped, as is shown in FIG. 6 for the neck ring segment 46. In the normal operating position of the invert arm assembly 20, the head portion of each invert arm segment flange is received within an opening of a neck ring segment flange, as is shown in FIG. 6 where the head portion of the T-shaped invert arm segment flange 50 is received within an opening of the C-shaped neck ring segment 46, to positively axially position the neck ring segments 38, 40 with respect to the adjacent invert arm segments 22, 24.

To accurately radially center each neck ring assembly 28 in the aperture 26 in which it is located, each of the invert arm segment flanges 48, 50 is provided with one or more, shown as two, centering pins 52 (FIGS. 4 and 6). Each centering pin 52 is provided with an enlarged rounded radially innermost end portion 52a, and is resiliently biased into contact with an adjacent portion of a neck ring assembly 28 by a coil spring 54. The coil spring 54 is trapped between the head portion 52a of the centering pin 52 and an inwardly projecting annular portion of the invert arm segment flange, shown as the portion 50a of the invert arm segment flange 50 in FIG. 6.

Figure 5:
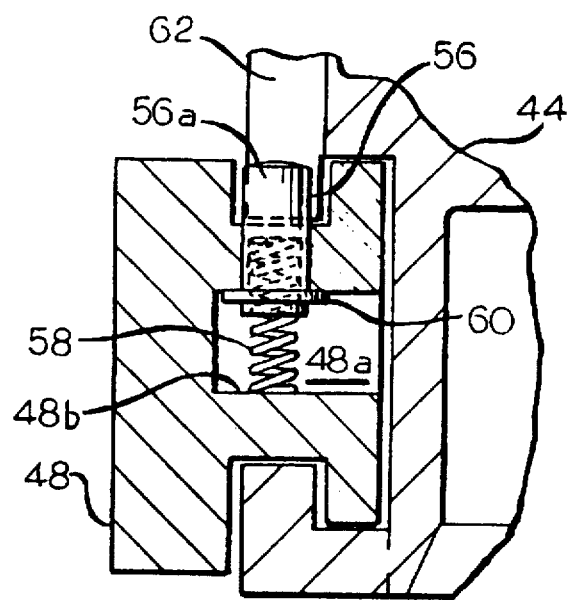
FIG. 5 is a cross-sectional view taken on line 5—5 of FIG. 4.

Proper circumferential orientation of each neck ring assembly 28 in an aperture 26 during normal operation of the invert arm assembly 20, while permitting rapid disengagement of the neck ring assembly 28 from the invert arm assembly 20, is obtained by providing the invert arm assembly with one or more, shown as two, upwardly projecting locking pins 56 (FIGS. 4, 5, 8 and 9), one in each of the invert arm segments 22, 24, at diametrically spaced locations in alignment with the invert arm segment flanges 48, 50. A free end portion 56a of each locking pin 56 projects upwardly beyond the shank portion of each of the T-shaped invert arm segment flanges 48, 50 with which it is associated, and is resiliently biased toward its uppermost position by a coil spring 58 that is trapped between a collar 60 secured to the locking pin 56 and a shoulder within a bore in the invert arm segment flange in which locking pin 56 is positioned. This is shown in FIG. 5 for the locking pin 56 associated with the invert arm segment flange 48, in which the coil spring 58 is located in a bore 48a of the invert arm segment flange 48 and engages a shoulder 48b of the bore 48a.

Figure 9:
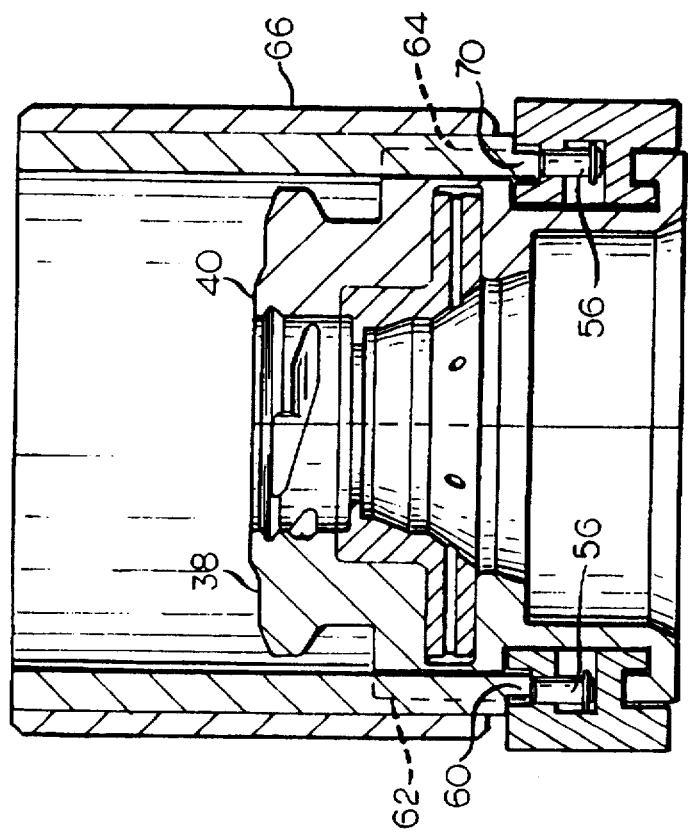
FIG. 9 is a view similar to FIG. 8 with the hand tool in engagement with the neck ring assembly during its removal from the invert arm assembly.
Figure 11:
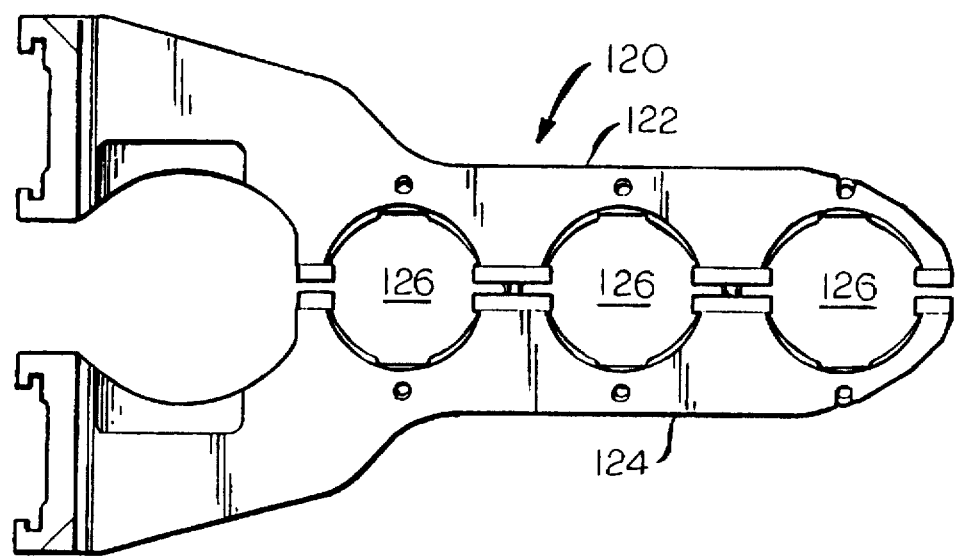
FIG. 11 is a plan view of the invert arm assembly of FIG. 10.
Figure 12:
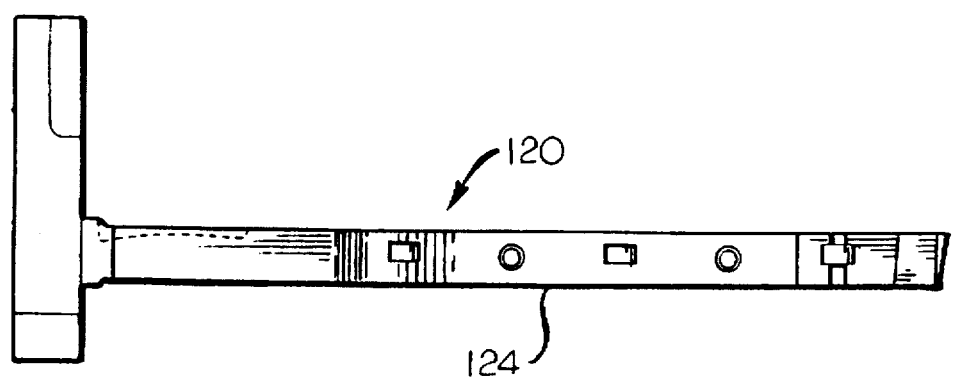
FIG. 12 is an elevation view of the invert arm assembly of FIGS. 10 and 11.

The neck ring assembly 28 is normally prevented from turning within the aperture 26 in which it is located by providing the neck rings segments 38, 40 with slots 62, 64, respectively, in alignment with the locking pins 56, the free ends 56a of the locking pins 56 projecting into the slots 62, 64. However, by simultaneously depressing the locking pins 56 against the force of the coil spring 58, the neck ring assembly 28 can be rotated to a sufficient extent to permit the neck ring segment flanges 44, 46 to align with the spaces between the ends of the invert arm segment flanges 48, 50, to thereupon permit the neck ring assembly 28 to be readily withdrawn from the aperture 26. To that end, an annular tool 66 with a spaced apart pair of downwardly depending fingers 68, 70 that align with the slots 62, 64, respectively, is provided to permit manual depression of the locking pins 56, as is shown in FIG. 9.

In the embodiment of FIGS. 10–15 elements that correspond to elements of the embodiment of FIGS. 1–9 are identified by three digit reference numerals, the last two digits of which correspond to the two digit numerals of the corresponding element of the embodiment of FIGS. 1–9.

Figure 10:
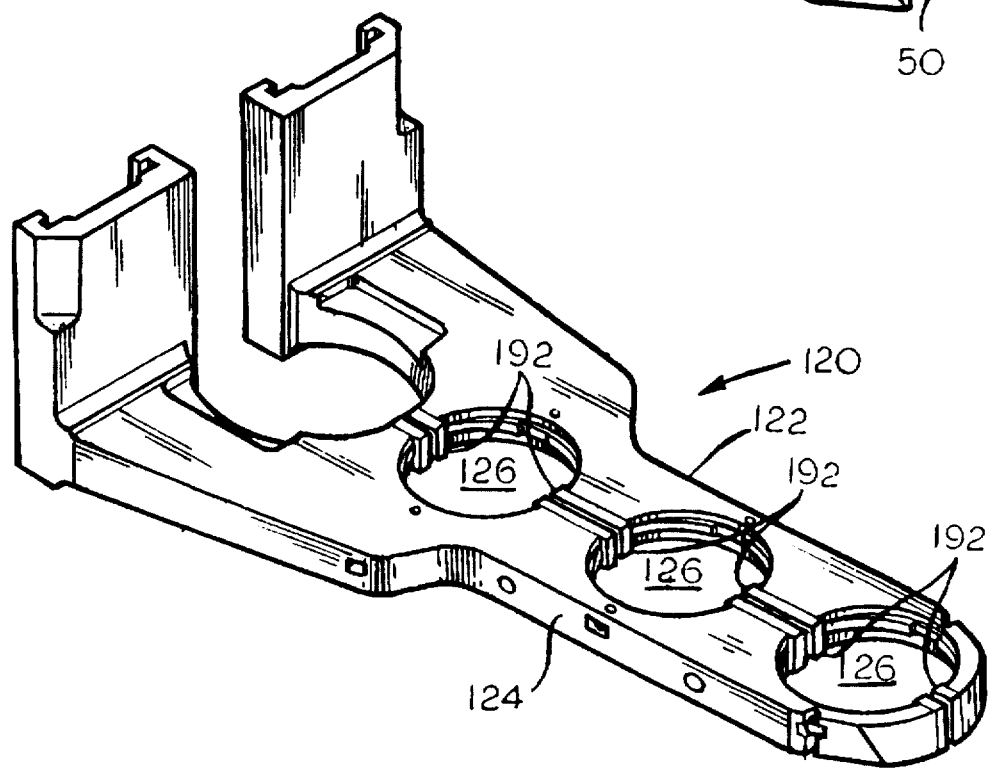
FIG. 10 is a view similar to FIG. 1 of an alternative embodiment of an invert arm assembly, without neck ring assemblies, according to the present invention.
Figure 2:
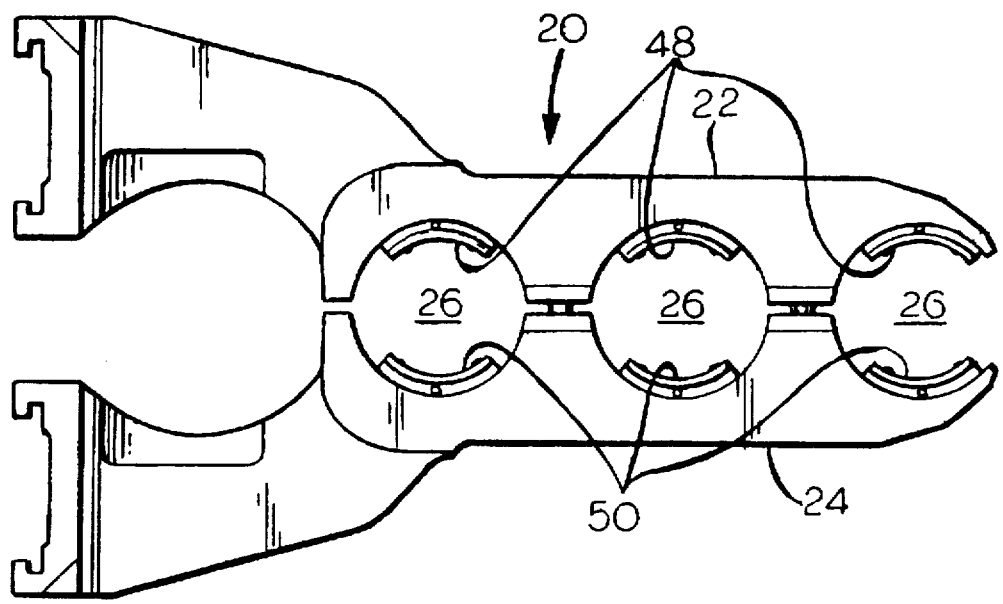
FIG. 2 is a plan view of the invert arm assembly of FIG. 1.
Figure 3:
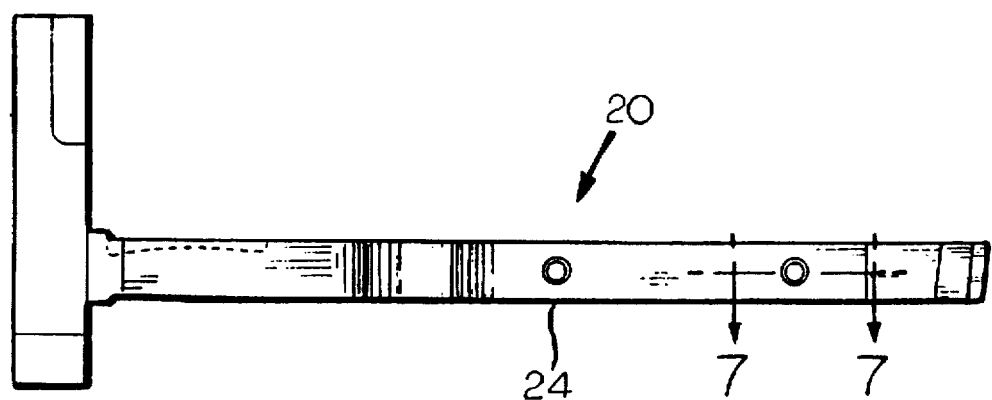
FIG. 3 is an elevation view of the invert arm assembly of FIGS. 1 and 2.

FIG. 10 illustrates an invert arm assembly, generally identified by reference numeral 120. The invert arm assembly 120 is made up of side-by-side invert arm segments 122, 124. The invert arm segments 122, 124 are separable to open a space therebetween, but when closed, as shown, define apertures 126 for receiving neck ring assemblies that must be removable from the invert arm assembly 120. The invert arm assembly 120 is shown in FIG. 14 with a neck ring assembly 128 installed in an aperture 126, and it is to be understood that similar neck ring assemblies 128 will be installed in the other apertures 126 of the invert arm assembly 120 during the operation of an I.S. glass container forming machine having invert arm assemblies corresponding to the invert arm assembly 120.

To accurately align the invert arm segments 122, 124 upon their closing, one of the invert arm segments 122, 124, shown as the invert arm segment 122, is provided with an opening 130, and a pin 132 is inserted in the opening 130, the pin 132 being provided with a collar 134 that limits the depth of the insertion of the pin 132 into the opening 130. The other of the invert arm segments 122, 124, shown as the invert arm segment 124, is provided with an opening 136 that is aligned with the opening 130 when the invert arm segments 122, 124 are properly aligned. The free end of the pin 132 is slidably received with the opening 136 as the invert arm segments 122, 124 open and close with respect to one another to ensure that the invert arm segment 122, 124 remain in proper alignment with one another, the opening 136 being provided with a generally T-shaped annular bushing 137 to facilitate the sliding of the free end of the pin 132 with respect to the opening 136.

The neck assembly 128 is made up of a pair of semicircular neck ring segments 138, 140, which are joined end to end in a circular figuration as is shown in FIG. 14 when the invert arm segment 122, 124 are closed with respect to one another, to permit the neck ring assembly 128 to mold a finish on a glass container being formed and to grasp the container being formed during its transfer, by a 180° inverting motion in a vertical plane, from the blank mold station to the blow mold station of an I.S. glass forming machine. The neck ring assembly 128 is also provided with an internal guide ring 142 that is endless in configuration and the guide ring 142 serves to guide the neck ring segments 138, 140 as they open and close with respect to one another.

The neck ring segments 138, 140 are provided with a diametrically opposed pair of outwardly facing arcuate slots 172, 174, respectively, and the invert arm segments 122, 124 are provided with arcuate shoes 176, 178, respectively, that are receivable in the slots 172, 174, respectively, to securely but disengageably retain the neck ring assembly 128 in an aperture 126 of the invert arm assembly 120. As is shown in FIG. 14, the shoes 176, 178 are biased toward their innermost positions by springs 180 (FIG. 13) to securely retain a neck ring assembly 128 in the aperture 126. However, the shoes 176, 178,can be retracted from their neck ring assembly retaining positions of FIG. 14 to positions shown in FIG. 15, whereupon a neck ring assembly 128 can be removed from an aperture 126 of the invert arm assembly 120 by a simple pulling motion and the replacement neck ring assembly 128 can be inserted into the aperture 126 by a simple pushing motion. It is to be pointed out that the spring biased arcuate shoes 176, 178 inherently serve to radiantly center each neck ring assembly 128 within its aperture 126.

Figure 15:
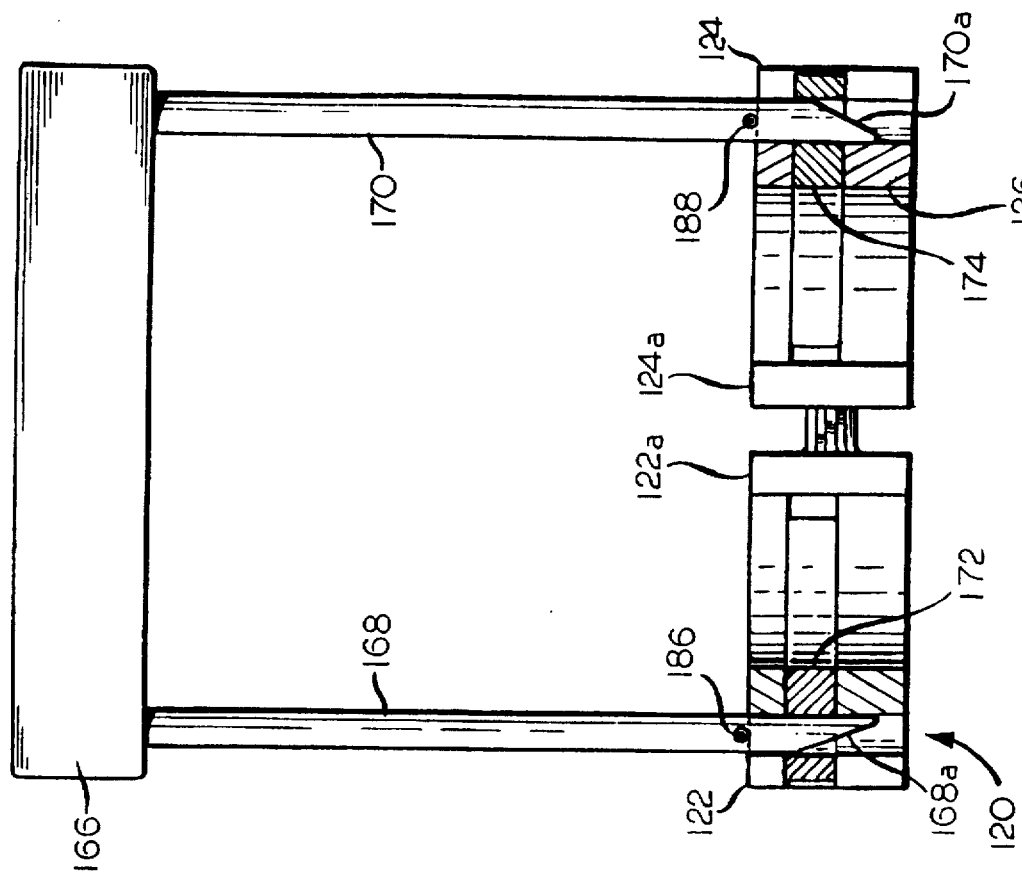
FIG. 15 is an elevation view, in cross section, showing the position of the hand tool of FIG. 14 in relationship to the invert arm assembly during the assembly of a neck ring assembly into, or removal of a neck ring assembly from the invert arm assembly.
Figure 13:
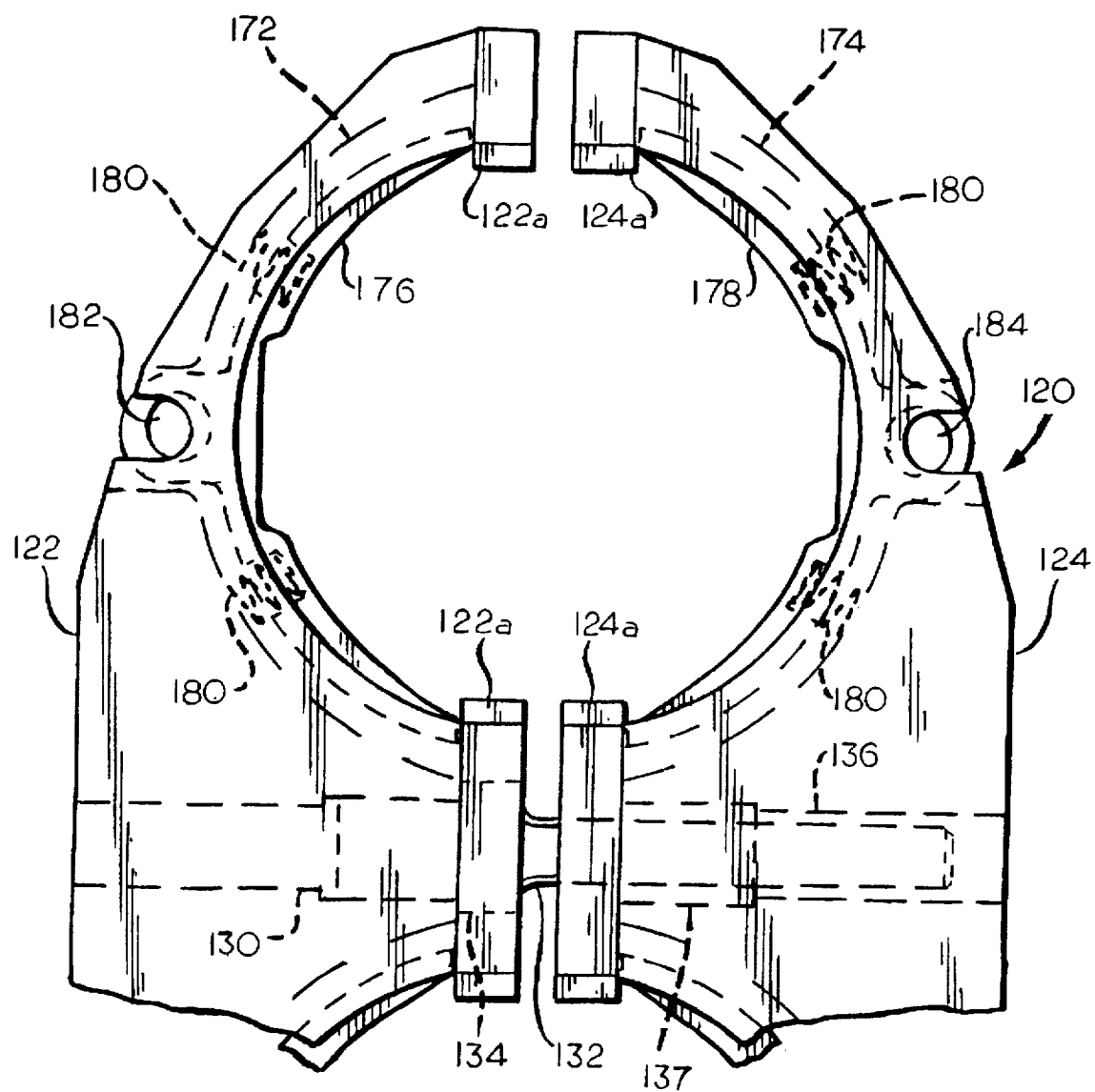
FIG. 13 is a fragmentary plan view, at an enlarged scale, of the invert arm assembly of FIGS. 10–12.

A hand tool 166 is provided to retract the spring-biased arcuate shoes 176, 178 to permit a neck ring assembly 128 to be withdrawn from, or inserted into, an aperture 126. The hand tool 166 is provided with a spaced apart pair of depending prongs 168, 170, each of which has a free end 168a, 170a, respectively, which it is tapered outwardly as it proceeds upwardly. The free ends 168a, 170a of the depending prongs 168, 170 are receivable in apertures 182, 184 of the shoes 176, 178, respectively, that are partly blocked by the invert arm segments 122, 124, respectively, when the shoes 176, 178 are in their innermost positions, as shown in FIGS. 13 and 14. When the free ends 168a, 170a of the depending prongs 168, 170 are inserted into the apertures 182, 184, respectively, the tapered configuration of the free ends 168a, 170a will wedge the shoes 176, 178 radially outwardly, respectively, until the shoes 176, 178 are retracted sufficiently far to permit a neck ring assembly 128 to be removed from, or inserted into, the aperture 126, a condition that is shown in FIG. 15 To limit the depth of the insertion of the prongs 168, 170 into the apertures 182, 184, respectively, the prongs 168, 170 are provided with radially outwardly projecting pins 186, 188, respectively, that will engage the invert arm segments 122, 124, respectively when the shoes 176, 178 have been radially retracted a distance sufficient to permit a neck ring assembly 128 to be removed from the aperture 126.

To properly circumferentially orient each neck ring assembly 128 in an aperture 126, the neck ring assembly 128 is provided with a diametrically opposed pair of longitudinally extending slots 190, only one of which is illustrated in FIG. 14. The slots 190 engage keys 192 in each aperture 126 of FIG. 10, the keys 192 being formed from adjacent portions 122a, 124a of the invert arm segments 122, 124, respectively, when the invert arm segments 122, 124 are in proximity to one another. The adjacent portion 122a, 124a, thus, serve to prevent the removal of the neck ring assembly 128 from, and the insertion of a neck ring assembly 128 into, an aperture 126 when the invert arm segments 122, 124 are spaced apart from one another, as they will be at the blow mold side of an I.S. machine during removal of finished containers from the neck ring assembly 128.

In the embodiment of FIGS. 16–22 of the drawing, elements that correspond to elements of the embodiment of FIGS. 1–9 and/or to the embodiment of FIGS. 10–15 are identified by a three hundred (300) series numeral, the last two (2) digits of which correspond to the two (2) digit numerals of the corresponding elements of the embodiment of FIGS. 1–9 or to the last two (2) digits of the numerals of the corresponding elements of the embodiment of FIGS. 10–15.

Figure 16:
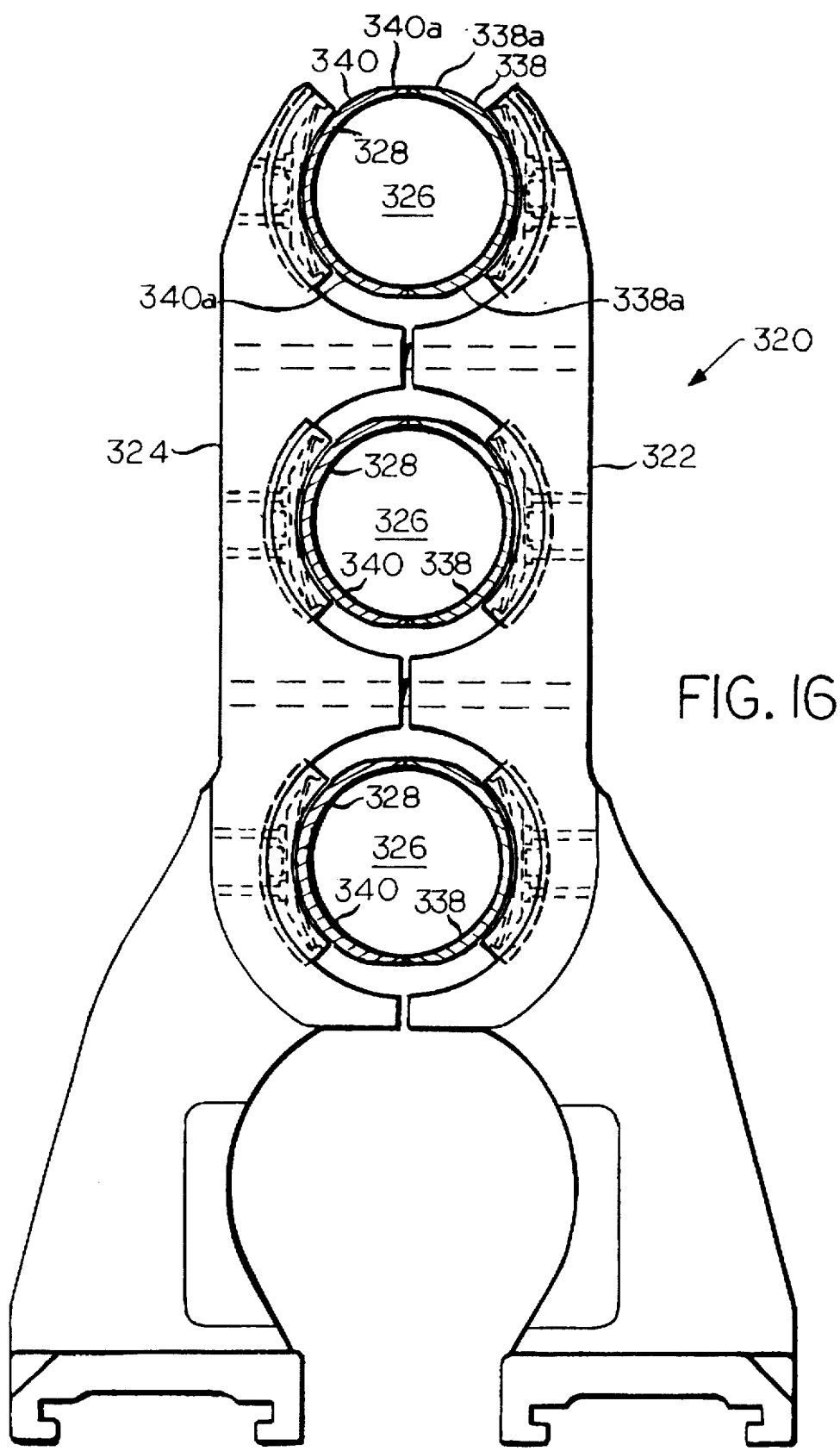
FIG. 16 is a plan view of another alternative embodiment of an invert arm assembly according to the present invention.

FIG. 16 shows a plurality of neck ring assemblies 328 installed in apertures 326 of an invert arm assembly 320, which is made up of an opposed pair of invert arm segments 322, 324. Each neck ring assembly 328 is made up of a pair of semi-circular neck ring segments 338, 340, each of whose opposed ends is positioned adjacent to an opposed end of the other neck ring segment, and the junctures between the segments 338, 340 of the neck ring assemblies 328 are aligned in the operating positions of the neck ring assemblies 328, as shown in FIG. 16. As is also shown in FIG. 16, the segments 338, 340 of the neck ring assemblies 328 are provided with flattened portions 338a, 340a, respectively, on opposed sides of the junctures therebetween, for a purpose which will hereinafter to be described more fully.

The invert arm segments 322, 324 are provided with a diametrically opposed pair of generally C-shaped, inwardly facing shoes 396 surrounding each of the apertures 326. One of the shoes 396 is shown in detail in perspective in FIG. 17. Each shoe 396 is secured to adjacent structure of the invert arm segment 322 or 324 in which it is installed by pins (not shown) extending through a spaced apart pair of holes 398, 399, and each is provided with a leaf spring 397 whose opposed ends are restrained by the shoe 396. The springs 397 are free to flex inwardly with respect to the shoes 396 as shown, for example, in FIGS. 20 and 22. The shoes 396 are spaced between a diametrically opposed pair of outwardly projecting flanges 328a, 328b of a neck ring assembly 328 as the neck ring assembly 328 is being installed in an aperture 326, or as it is being removed from an aperture 326, during which time the neck ring assembly 328 is oriented at a right angle around its central axis with respect to its normal operating position, as can be seen by a comparison of FIGS. 20 and 22. In any case, the spring 397 of an opposed pair of shoes 396 engages part-cylindrical portions of the neck ring segments 338, 340a in the operating position of each of the neck ring assemblies 328 to positively center each neck ring assembly 328 in the aperture 326 in which it is installed. The flat portions 338a, 340a of the neck ring segments 338, 340, however, readily permit a neck ring assembly 328 to be inserted into, or removed from, an aperture 326, when the neck ring assembly 328 is oriented at a right angle with respect to its normal operating position.

Figure 17:
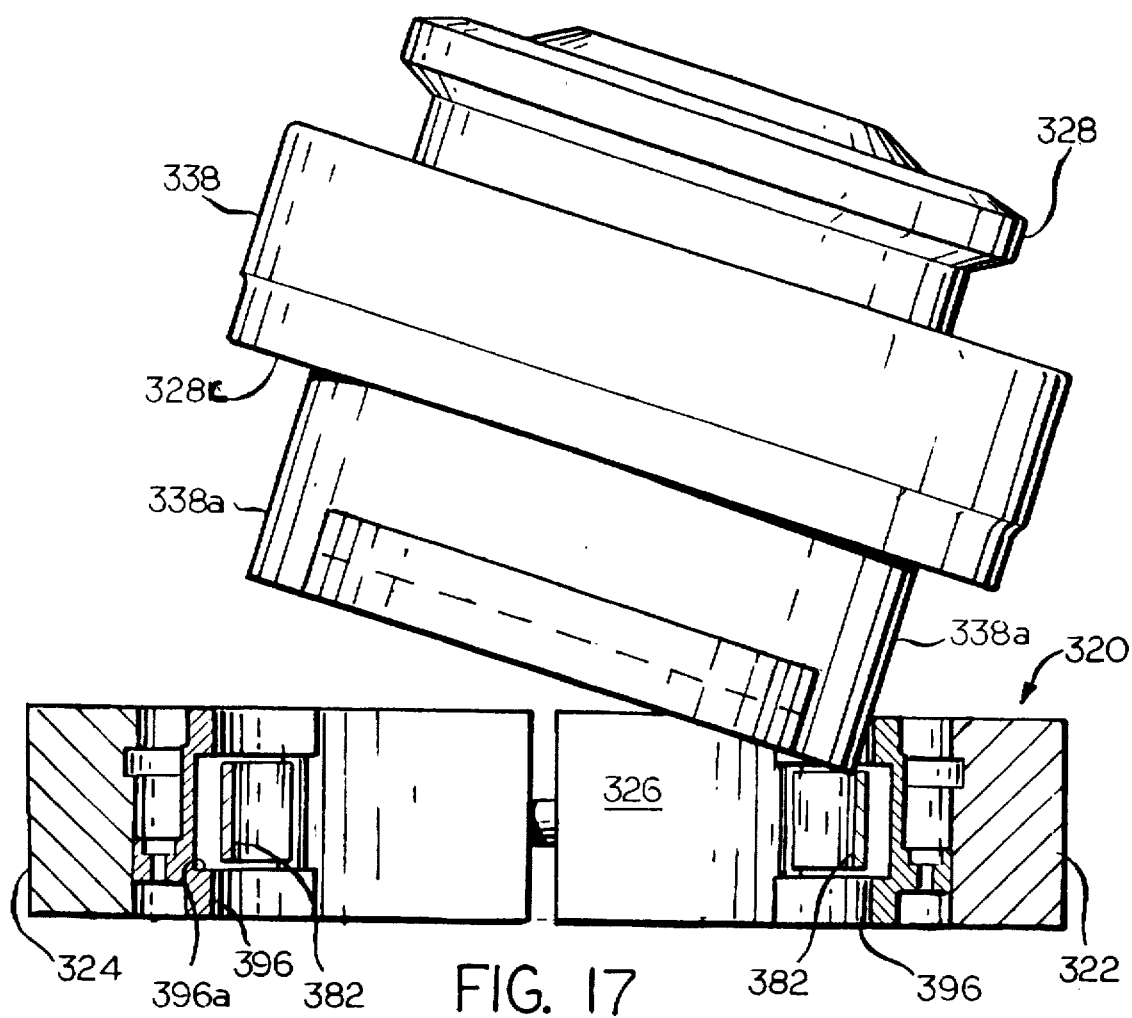
FIG. 17 is a view, partly in cross-section and partly in perspective, showing a step in the assembly, or disassembly, of certain of the elements of the invert arm assembly of FIG. 16.
Figure 18:
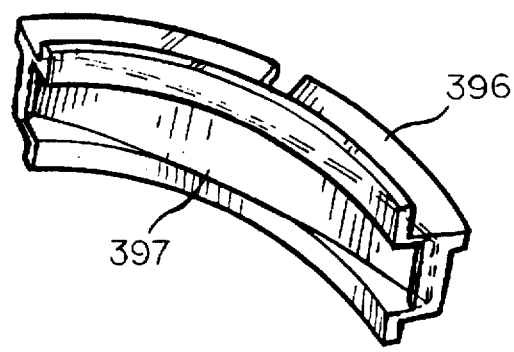
FIG. 18 is a perspective view of an element of the invert arm assembly of FIGS. 16 and 17.
Figure 22:
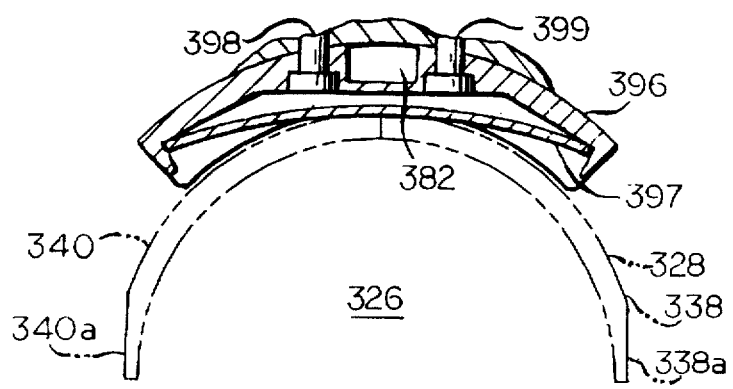
FIG. 22 is a sectional view taken on line 22—22 of FIG. 21.
Figure 21:
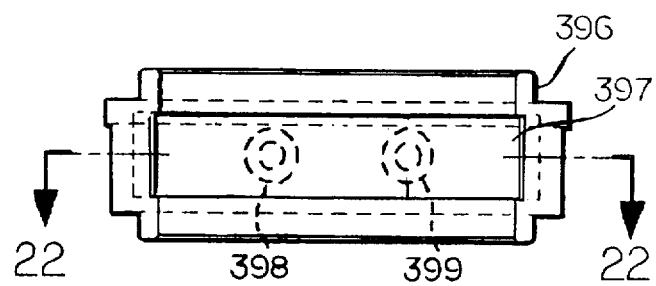
FIG. 21 is an elevational view of the element of FIG. 18 during the time interval shown in FIG. 16.
Figure 20:
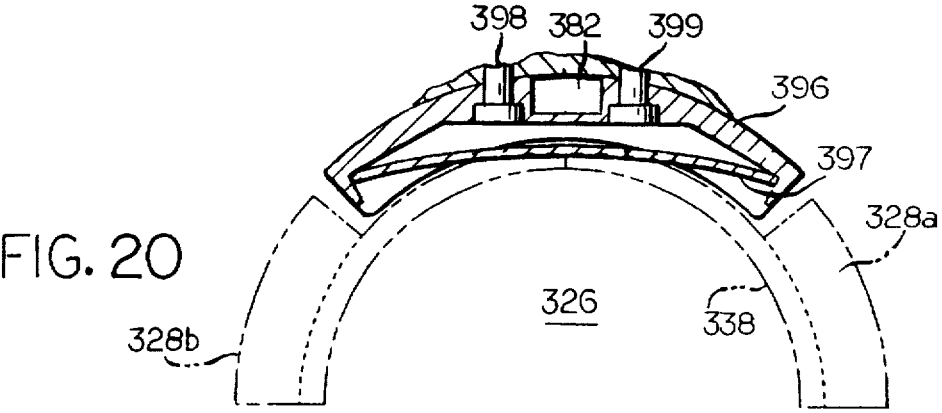
FIG. 20 is a sectional view taken on line 20—20 of FIG. 19.
Figure 19:
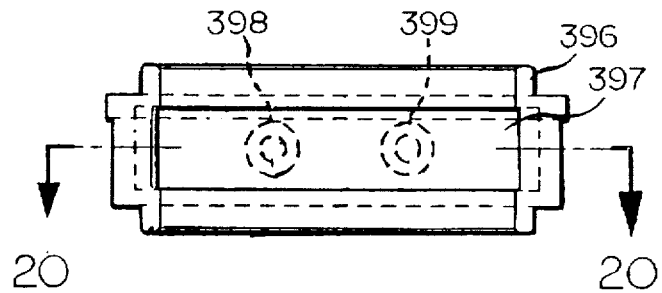
FIG. 19 is an elevational view of the element of FIG. 18 during the time interval shown in FIG. 17.

Each neck ring assembly 328 is restrained against movement along its central axis in its normal operating position, at its lowermost position in the orientation shown in FIG. 17, by engagement of an annular shoulder 328c of the neck ring assembly 328 against an annular shoulder portion 396a of the shoe 396 and, at its uppermost position, by interference between the shoe 396 and the flanges 328a, 328b of the neck ring assembly 328. Further, each neck ring assembly 328 is releasably restrained against movement around its central axis in its normal operating position by retracting the shoe 396 along the axis of the holes 398, 399 by inserting the prongs of a hand tool similar to the hand tool 166 of the embodiment of FIGS. 10–15 into an aperture 382 of each of an opposed pair of shoes 396.

The advantage of the embodiment of FIGS. 16–22 over the embodiments of FIGS. 1–9 or 10–15 is that the embodiment of FIGS. 16–22 is not as subject to being fouled with mold dope in glass forming machines whose forming molds are periodically swabbed with mold dope for purposes of facilitating the separation of the containers being formed therein from the structure of the molds.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof

What is claimed:

1. An invert arm assembly for a glass container forming machine, said invert arm assembly comprising:

an opposed pair of invert arm segments, said invert arm segments being aligned with one another and being movable with respect to one another from positions where said invert arm segments are adjacent to one another to positions where said invert arm segments are separated from one another, said invert arm segments defining an aperture for receiving and retaining a neck ring assembly when said invert arm segments are disposed adjacent to one another, said invert arm segments being oscillatable in unison through an arc of approximately 180°;

a neck ring assembly, said neck ring assembly being disposed in said aperture and being retained by said invert arm segments when said invert arm segments are disposed adjacent to one another and being oscillatable with said invert arm segments when said invert arm segments are oscillated; and means for disengagably securing said neck ring assembly to said invert arm segments within said aperture to permit said neck ring assembly to be removed from said aperture while said invert arm seaments are disposed adjacent to one another; wherein said means for disengagably securing comprises:

an opposed pair of arcurate shoes carried by said invert arm segments, said opposed pair of arcuate shoes being movable transversely of said aperture between radially innermost positions and radially outermost positions and releasably engaging said neck ring assembly in the radially innermost positions of said arcuate shoes; and spring means resiliently biasing said pair of arcuate shoes toward their radially innermost positions; and wherein said neck ring assembly comprises circumferentially extending slot means, said pair of arcuate shoes of said means for disengagably securing being engaged in said circumferentially extending slot means when said pair of arcuate shoes are in their radially innermost positions and not being engaged in said circumferentially extending slot means when said pair of arcuate shoes are in their radially outermost positions.

2. An invert arm assembly according to claim 1 and further comprising:

a pin carried by one of said opposed pair of invert arm segments and projecting outwardly therefrom toward the other of said opposed pair of invert arm segments; and an opening in the other of said opposed pair of invert arm segments, said pin being slidably received in said opening to maintain alignment between said opposed pair of invert arm segments as they move with respect to one another.

3. An invert arm assembly according to claim 1 wherein each of said pair of arcuate shoes comprises:

an aperture extending transversely of said circumferentially extending slot means, said aperture being engagable by a hand tool from a location external to said invert arm segment to wedge said each of said arcuate shoes toward its radially outermost position.

4. An invert arm assembly for a glass container forming machine, said invert arm assembly comprising:

an opposed pair of invert arm segments, said invert arm segments being aligned with one another and being movable with respect to one another from positions where said invert arm segments are adjacent to one another to positions where said invert arm segments are separated from one another, said invert arm segments defining an aperture for receiving and retaining a neck ring assembly when said invert arm segments are disposed adjacent to one another, said invert arm segments being oscillatable in unison through an arc of approximately 180°;

a neck ring assembly, said neck ring assembly being disposed in said aperture and being retained by said invert arm segments when said invert arm segments are disposed adjacent to one another and being oscillatable with said invert arm segments when said invert arm segments are oscillated; and means for disengagably securing said neck ring assembly to said invert arm segments within said aperture to permit said neck ring assembly to be removed from said aperture while said invert arm segments are disposed adjacent to one another; wherein said means for disengagably securing comprises:

an externally facing longitudinally extending slot in an exterior of said neck ring assembly;

a pin carried by one of said invert arm segments, said pin having a free end engagable in said externally facing slot to prevent rotation of said neck ring assembly within said aperture of said invert arm assembly; and spring means for resiliently biasing said pin toward said neck ring assembly to cause the free end of said pin to project into said externally facing slot to prevent rotation of said neck ring assembly, said pin being engagable by a hand tool from a location external to said invert arm assembly to cause said pin to become disengaged from said slot, to thereby permit said neck ring assembly to be rotated within said aperture; and wherein said means for disengagably securing said neck ring assembly to said invert arm segments within said aperture further comprises; means for preventing axial motion of said neck ring assembly within said aperture when the free end of said pin is engaged in said externally facing slot, and for permitting axial motion of said neck ring assembly within said aperture when the free end of said pin is not engaged in said externally slot and said neck ring assembly has been rotated within said aperture.

5. An invert arm assembly for a glass container forming machine, said invert arm assembly comprising:

an opposed pair of invert arm segments, said invert arm segments being aligned with one another and being movable with respect to one another from positions where said invert arm segments are adjacent to one another to positions where said invert arm segments are separated from one another, said invert arm segments defining an aperture for receiving and retaining a neck ring assembly when said invert arm segments are disposed adjacent to one another, said invert arm segments being oscillatable in unison through an arc of approximately 180°;

a neck ring assembly, said aperture said neck ring assembly being disposed in said aperture and being retained by said invert arm segments when said invert segments are disposed adjacent to one another and being oscillatable with said invert arm segments when said invert arm segments are oscillated; and means for disengagably securing said neck ring assembly to said invert arm segments within said aperture to permit said neck ring assembly to be removed from said aperture while said invert arm segments are disposed adjacent to one another; wherein said means for disengagably securing comprises:

an opposed pair of externally facing slots in an exterior of said neck ring assembly;

an opposed pair of pins, one of said opposed pair of pins being carried by one of said invert arm segments, the other of said opposed pair of pins being carried by the other of said invert arm segments, each of said opposed pair of pins having a free end, the free end of one of said opposed pair of pins being receivable in one of said opposed pair of externally facing slots, the free end of the other of said opposed pair of pins being simultaneously receivable in the other of said opposed pair of externally facing slots;

a pair of springs, one of said pair of springs resiliently biasing one of said pair of pins toward said neck ring assembly to cause the free end of said one of said pair of springs to project into one of said externally facing slots of said neck ring assembly, the other of said pair of springs resiliently biasing the free end of the other of said pair of pins cause the free end of said other of said pair of pins to project into the other of said pair of externally facing slots, each of said pair of pins being simultaneously engagable by a hand tool from a location external to said invert arm assembly to cause said pair of pins to become disengaged from said pair of slots, to thereby permit said neck ring assembly to be rotated within said aperture; and means for preventing axial motion of said neck ring assembly within said aperture when the free end of each of said pair of pins is engaged in an externally facing slot of said pair of externally facing slots, and for permitting axial motion of said neck ring assembly within said aperture when the free end of each of said pair of pains is not engaged in an externally facing slot of said externally facing slots and said neck ring assembly has been rotated by a part of a turn within said aperture.

6. An invert arm assembly for a glass container forming machine, said invert arm assembly comprising:

an opposed pair of invert arm segments, said invert arm segments being aligned with one another and being movable with respect to one another from positions where said invert arm segments are adjacent to one another to positions where said invert arm segments are separated from one another, said invert arm segments defining an aperture for receiving and retaining a neck ring assembly when said invert arm segments are disposed adjacent to one another, said invert arm segments being oscillatable in unison through an arc of approximately 180°;

a neck ring assembly, said neck ring assembly being disposed in said aperture and being retained by said invert arm segments when said invert arm segments are disposed adjacent to one another and being oscillatable with said invert arm segments when said invert arm segments are oscillated; and means for disengagably securing said neck ring assembly to said invert arm segments within said aperture to permit said neck ring assembly to be removed from said aperture while said invert arm segments are disposed adjacent to one another;

wherein said means for disengagably securing comprises an opposed pair of generally C-shaped shoes carried by said invert arm segments, each of said shoes engaging opposed ends of a resilient, arcuate spring therein said arcuate spring resiliently engaging an exterior portion of said neck ring assembly.

* * * * *